United States Patent [11] 3,596,193

[72] Inventor Duane Edmond Dunwoodie
Los Alto, Calif.
[21] Appl. No. 716,400
[22] Filed Mar. 27, 1968
[45] Patented July 27, 1971
[73] Assignee Wiltron Company
Palo Alto, Calif.

[54] SWEEP OSCILLATOR WITH INTENSITY FREQUENCY MARKER
4 Claims, 4 Drawing Figs.

[52] U.S. Cl. 328/185, 178/6, 307/228, 315/26, 325/335, 328/189, 331/178
[51] Int. Cl. H03k 4/12
[50] Field of Search 307/228; 328/185, 189; 178/6 TT; 315/26; 325/335, 336, 337; 331/178

[56] References Cited
UNITED STATES PATENTS

| | | | |
|---|---|---|---|
| 2,426,201 | 8/1947 | Grieg | 315/26 X |
| 2,564,006 | 8/1951 | Haworth et al. | 328/189 X |
| 2,825,848 | 3/1958 | Casey | 328/185 X |
| 2,905,752 | 9/1959 | Loughlin | 178/5.4 |
| 3,118,085 | 1/1964 | Clergue et al. | 345/26 |
| 3,320,531 | 5/1967 | Wu | 328/189 X |
| 3,364,366 | 1/1968 | Dryden | 328/185 X |
| 2,414,096 | 1/1947 | Dimond | 325/335 X |
| 2,418,750 | 4/1947 | Bliss et al | 325/335 X |
| 2,507,525 | 5/1950 | Hurvitz | 325/335 |
| 3,364,437 | 1/1968 | Loposer et al. | 331/178 X |
| 3,379,976 | 4/1968 | Niedereder | 331/178 X |

*Primary Examiner*—Donald D. Forrer
*Assistant Examiner*—R. C. Woodbridge
*Attorney*—Flehr Hohbach, Test, Albritton & Herbert Flehr

ABSTRACT: A sweep oscillator for use in conjunction with a cathode-ray oscilloscope provides an oscilloscope trace of a frequency response characteristic of a network under test. An intensified marker portion for identifying the frequency of a particular point on the trace is provided by slowing the electron beam at that point by modifying the sweep rate of the oscillator. A comparator compares the sweep voltage to a preset DC voltage and operates on the sweep voltage to reduce its rate or slope at the marker spot desired. The voltage output of the comparator is shaped to cause the length of the marker on the trace to remain at a constant percentage of the total sweep time.

INVENTOR.
DUANE E. DUNWOODIE
BY Flehr, Hohbach, Test, Albritton & Herbert
ATTORNEYS INVENTOR.
DUANE E. DUNWOODIE
BY
Fehr, Hohbach, Test, Albritton & Herbert
ATTORNEYS

SWEEP OSCILLATOR WITH INTENSITY FREQUENCY MARKER

BACKGROUND OF THE INVENTION

The present invention is, in general, directed to a sweep oscillator and more specifically to an oscillator having a positionable frequency marker which intensifies the cathode-ray oscilloscope trace at the point of interest.

A signal source which tunes automatically through a preset frequency range at a certain sweep rate is termed a sweep oscillator. The major components of such an oscillator are a sweep generator which provides a linear ramp of voltage driving a voltage controlled oscillator to thus provide the appropriate frequency sweep. This linear ramp also is coupled to the horizontal deflection of a cathode-ray oscilloscope which displays on its vertical axis the frequency response of the network under test.

In such a system it is often desired to identify a particular point on the oscilloscope trace to determine its exact frequency. A common method of accomplishing this is to provide a frequency marker whose position has been previously calibrated as to frequency.

There are two common methods of providing a marker. First the Z axis of the cathode-ray tube beam may be modulated to cause an intensification of the beam at the desired marker point. This is unsatisfactory because of a lack of sensitivity since the beam voltage magnitude does not provide s sufficient differentiation or contrast with the existing trace. Such a Z axis marker also requires a third connection which is capacity coupled. This prevents its usage on anything but a relatively fast display.

A second method of marking is by pips applied to one deflection axis; for example, the pip normally would by applied to a vertical deflection axis to in effect blank the rectified high frequency signal. One difficulty with a pip marker is its identification on a trace which is moving relatively fast or that has some other existing noise spikes. Another difficulty is that marker pips applied to one deflection axis are ineffective when the trace is moving principally in that direction.

Lastly, a pip-type marker is especially ineffective when the associated oscilloscope is displaying two frequency dependent variables, such as a Smith-type plot, because the trace moves in all directions.

Another type of marker is of the birdie type in which a harmonic generator produces marker signals in accordance with the generated harmonics. These markers, since they are also applied to a predetermined deflection axis, suffer the same difficulties as a pip-type marker.

OBJECTS AND SUMMARY OF THE INVENTION

It is therefore a general object of this invention to provide an improved sweep oscillator with an intensity frequency marker.

It is another more specific object of the invention to provide a sweep oscillator as above which provides a marker relatively uniform intensity with variable sweep rates.

It is another object of the invention to provide a marker for a sweep oscillator which is effective regardless of direction of trace movement of an associated oscilloscope and which compensates for faster or slower movement of the sweep.

It is another object of this invention to provide a sweep oscillator with an intensity marker which also serves to intensify a pip or birdie-type marker.

It is another object of the invention to provide an effective marker when the network under test will not tolerate the rapid signal level variation of the pip marker.

It is another object of the invention to provide an effective frequency marker when direct connections are not possible between the sweep oscillator and display oscilloscope.

In accordance with the above objects there is provided a sweep oscillator having a predetermined frequency range comprising means for sweeping the sweep oscillator through a predetermined frequency range. Means coupled to the sweeping means slow its sweep for a portion of the frequency range.

DETAILED DESCRIPTION OF PREFERRED EMBODIMENT

Figure 1:
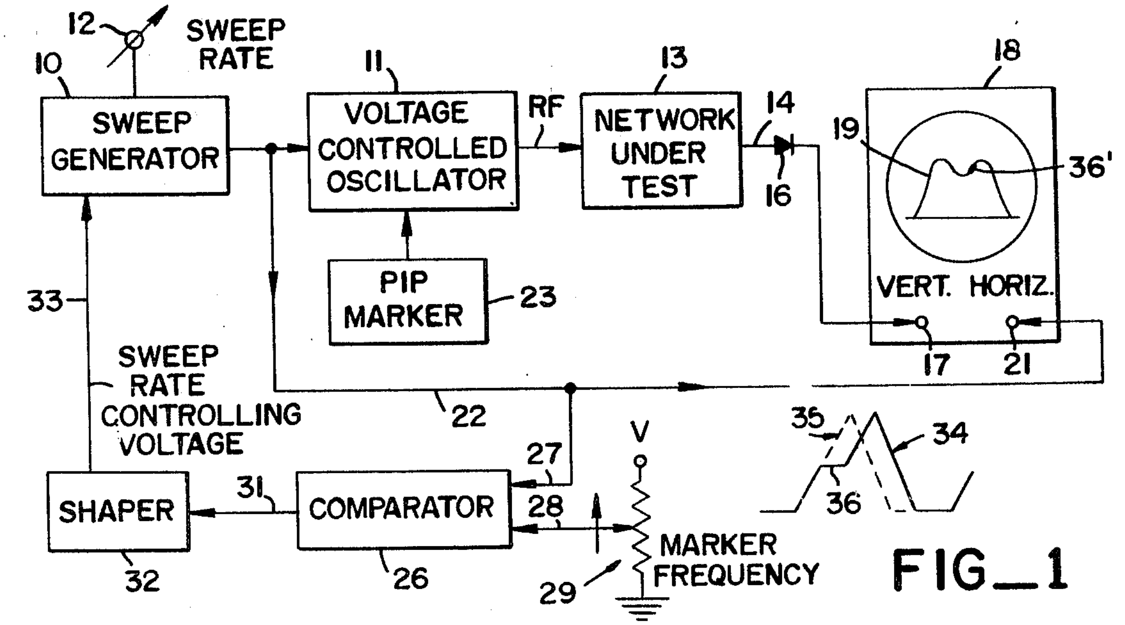
FIG. 1 is a block diagram of a sweep oscillator embodying the present invention.

Referring now to FIG. 1, a sweep generator 10 produces a linear ramp voltage which is coupled to a voltage controlled oscillator 11. A sweep rate control knob 12 varies the overall slope of the linear ramp voltage to thus control the sweep rate of the voltage controlled oscillator 11. The radiofrequency (RF) output of oscillator 11 is coupled to the network under test 13 having an output at 14 which is detected by a rectifier 16 and coupled to the vertical deflection input 17 of a cathode-ray oscilloscope display unit 18.

The display trace of the oscilloscope as shown at 19 is thus the envelope of the RF energy provided by the voltage controlled oscillator as modified by the frequency response characteristic of the network 13. The horizontal deflection input 21 of oscilloscope 18 is coupled to the output of sweep generator 10 on line 22 and provides a horizontal scale representing frequency.

A pip marker generator 23 is coupled to oscillator 11 to provide for periodic marks on trace 19 which are provided by momentarily blanking the RF output of oscillator 11.

The sweep oscillator as thus far described is well known in the art.

In accordance with the invention, a comparator 26 has one of its inputs 27 coupled to line 22 and the linear ramp voltage and a second input 28 coupled to a source of variable DC potential represented by potentiometer 29. When the linear ramp voltage becomes greater than the predetermined DC potential on input 28, the comparator has an output at 31 which is coupled to a waveshaper 32.

Waveshaper 32 has an output on line 33 coupled back into sweep generator 10 which is a sweep rate controlling voltage having a time duration as determined by the linear ramp voltage on line 22. This sweep rate controlling voltage causes the linear output ramp of sweep generator 10 to become substantially horizontal for the duration of the rate controlling vo't-age. For example, the final sweep voltage is illustrated in solid lines at 34 with the original sweep voltage in dashed lines at 35. The sweep controlling voltage thus produces a dwell at 36 represented by the substantially horizontal portion of the sweep voltage. In practice, portion 36 would not be horizontal but would have an average slope appreciably less than the initial slope of the sweep voltage. The flat portion 36 is reflected on trace 19 as an intensified portion 36' of the trace. This is because the electron beam traverses this portion of the phosphor screen at a much slower rate allowing more energy per unit time to be placed on the screen and therefore a brighter illumination results.

The location of marker spot 36' may be varied by potentiometer 29 labeled marker frequency. This determines when comparator 31 has an output since the linear sweep ramp voltage must exceed the DC reference voltage provided by potentiometer 29. In actual practice, potentiometer 29 would be coupled to an indicator which is movable on a frequency scale. By proper calibration, the user of the instrument of the present invention can therefore determine the frequency of any location on trace 19 by actuation of the potentiometer 29 to cause spot 36' to coincide with the point of interest on trace 19. The frequency scale associated with potentiometer 19 will then indicate that frequency.

As illustrated, in the preferred embodiment of FIG. 1 comparator 26 is responsive to the linear ramp voltage produced by sweep generator 10. However, since the ramp is linear and has a predetermined slope it provides an indication of time also. Thus, comparator 26 may also be thought of as providing a reference standard which is a predetermined time interval relative to the start of the sweep.

Figure 1A:
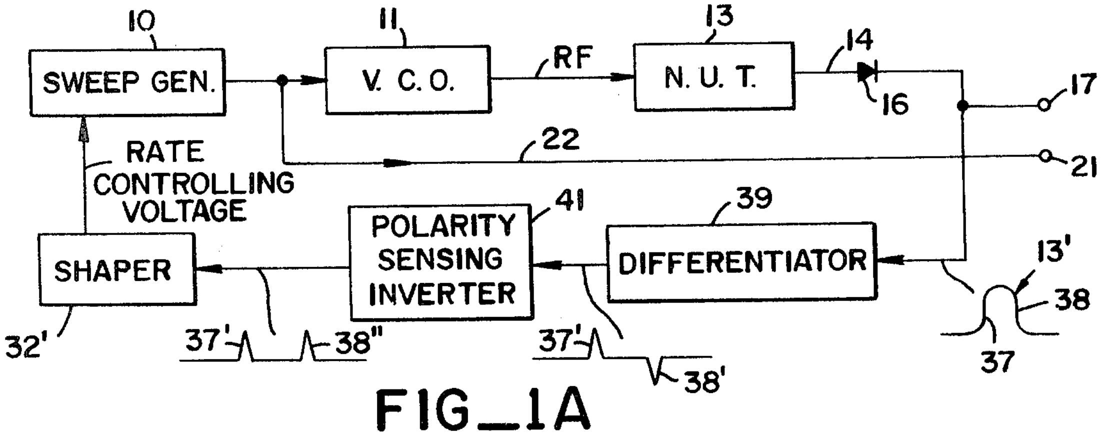
FIG. 1A is a block diagram of an alternative embodiment of a sweep oscillator embodying the present invention.

Comparator 26 may also be responsive to some other event as determined by the frequency of oscillator 11 as for example where the envelope 19 of the output waveform undergoes a rapid change of slope. Such a modification is illustrated in FIG. 1A where the network under test (N.U.T.) 13 produces an envelope 13' which has a positive slope 37 and a negative slope 38. A differentiator 39 is coupled to the output 14 of the network under test 13 and provides a positive spike 37' corresponding to slope 37 and a negative spike 38' corresponding to slope 38 of the output envelope 13'. A polarity sensing inverter 41 coupled to differentiator 39 inverts spike 38' to produce 38'' which when modified by a waveshaper 32' provides a rate controlling voltage which in essence slows the horizontal sweep at 18 substantially during the individual durations of spikes 37' and 38''. In other words, the sweep oscillator's sweeping rate is slowed for both the rise and fall of the output envelope 13' to thus provide a normal intensity trace at these portions of rapid change rather than a faint trace which would otherwise result. This feature is especially useful with display devices that are rate limited such as X–Y recorders since faster sweep rates may be used rather than slowing the entire plot to permit a tolerable writing rate on the steepest part of the display.

Figure 1B:
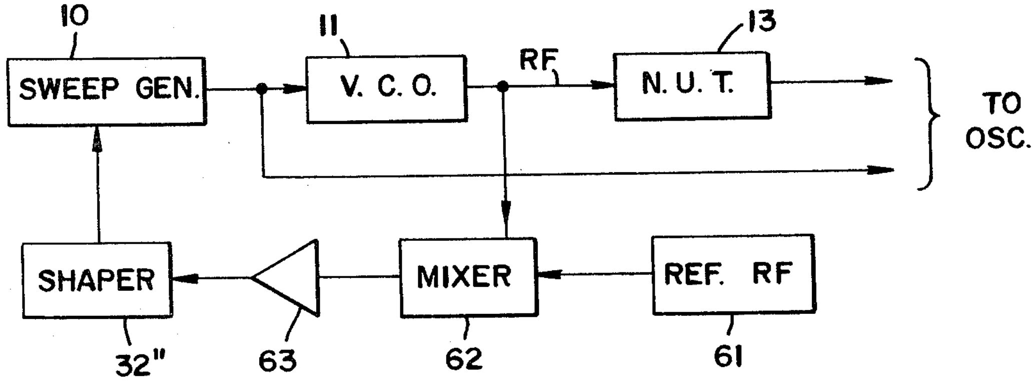
FIG. 1B is a block diagram of another alternative embodiment.

The embodiment of FIG. 1B illustrates the production of a rate controlling voltage in response to the swept RF coinciding with a reference RF 61. The RF output of voltage controlled oscillator (VCO) 11 is coupled to a mixer 62. Upon coincidence of the two RF inputs, a tuned amplifier 63 provides an output signal which activates shaper 32''.

If desired, similar results as above can be accomplished by replacing components 61, 62 and 63 with a crystal filter and detector.

Figure 2:
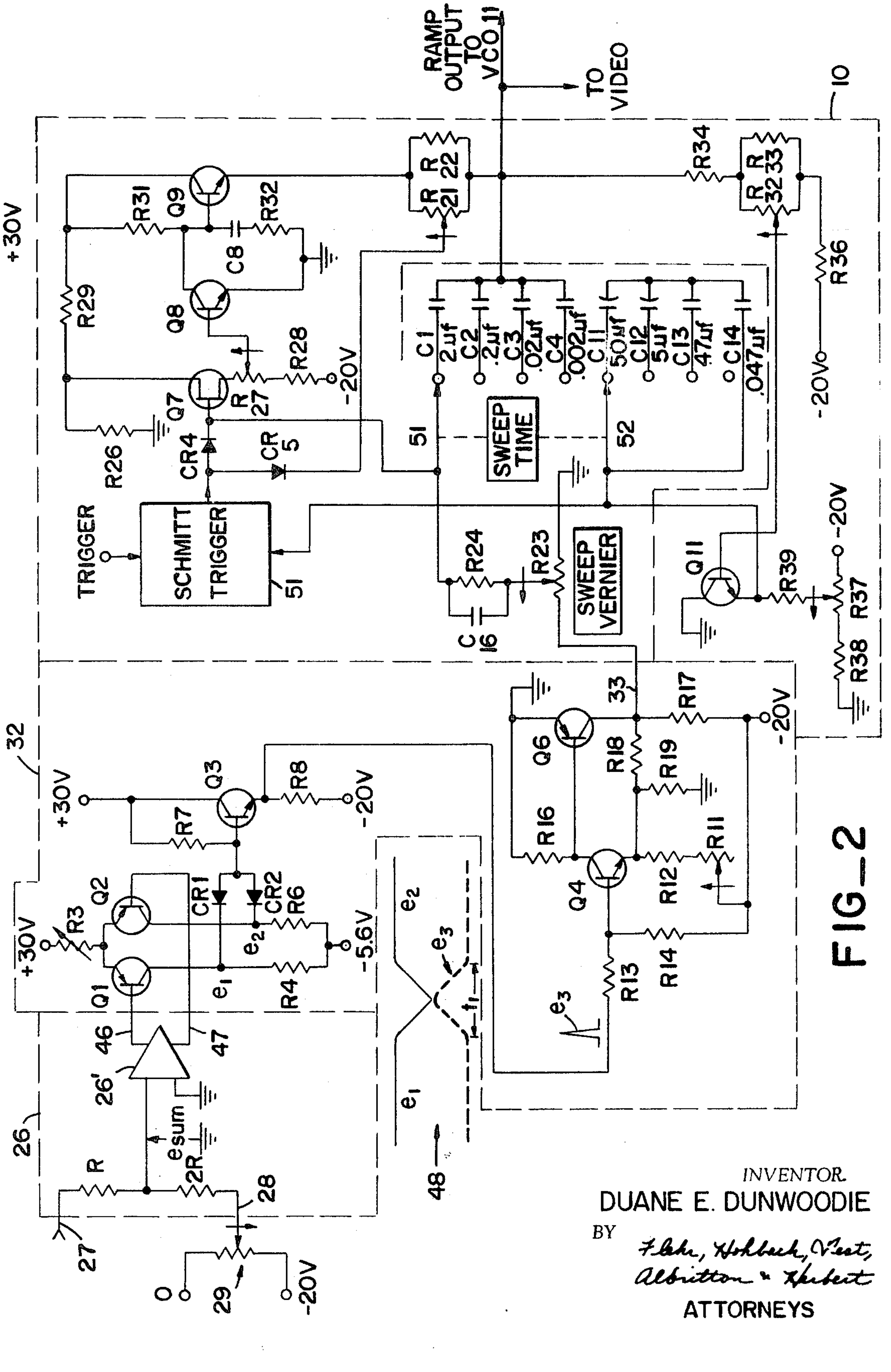
FIG. 2 is a detailed circuit diagram of selected portions of FIG. 1.

FIG. 2 is a detailed circuit schematic of the comparator 26, shaping circuit 32, and sweep generator 10 of FIG. 1. Referring now specifically to the comparator 26, as shown in dashed outline the comparator has an input on line 27 which is the sweep voltage and an input on line 28 which is a DC reference voltage provided by potentiometer 29. Resistors designated R and 2R corresponding to their relative values, sum the two input voltages, designated $e_{sum}$, into an amplifier 26'. This amplifier has a linear high gain which produces a double ended output on lines 46 and 47 of opposite polarity whenever the input voltage on line 27 exceeds that on line 28; in other words, when $e_{sum}$ crosses zero.

Coupled to outputs 46 and 47 are transistors Q1 and Q2 which form a differential amplifier. Line 46 is coupled to the base of Q1 and line 47 to the base of Q2. The emitters of Q1 and Q2 are tied together and to a 30 volt source through a variable resistor R3. The collectors of these transistors are tied together through respective resistors R4 and R6 which are terminated at a −5.6 volt source. As shown by the waveforms 48, waveform $e_1$ corresponds to the collector voltage of Q1 and waveform $e_2$ corresponds to the collector voltage of Q2. These two collectors are coupled to the emitter follower amplifier Q3 through diodes CR1 and CR2 respectively. Resistor R7 is coupled between the base and collector of Q3, the collector also being coupled to a +30 volt source. A resistor R8 couples a −20 volt source to the emitter of Q3. Waveforms 48 show in dashed outline the voltage, $e_3$, which appears at the emitter of Q3 as an effective marker pulse.

In operation, comparator 26 and shaper 32 are triggered when the $e_{sum}$ voltage at the input of amplifier 26 crosses zero.

This causes the current in differential amplifier Q1, Q2 to make a linear transition between the transistors. Collector voltage $e_2$ of Q2 moves from a −5.6 volt value to a more positive value as set by the +30 volt source and potentiometer R3. Voltage $e_1$ simultaneously makes the opposite transition as shown. Diode logic CR1 and CR2 couples these transitions to the base of amplifier Q3 which responds to the more negative of the two waveforms to thus provide an output marker pulse, $e_3$. By changing the available currents through potentiometer R3 the magnitude of pulse $e_3$ is controlled.

Marker pulse $e_3$ has a time duration $t_1$ which, due to the inherent characteristics of the differential amplifier Q1, Q2, is a constant percent of the total sweep period. That is, as the sweep rate increases this increased slope causes the differential amplifier voltages $e_1$ and $e_2$ to switch at a faster rate thus decreasing the time $t_1$. Thus, the marker pulse is responsive to any change in sweep rate to maintain a constant ratio of the length of the marker to total sweep time. In actual practice, a ratio of one to 20 has been found suitable. If this were not the case, at relatively slow sweep rates a very narrow spot would be produced and at fast sweep rates the marker spot would extend along the oscilloscope trace an undue length.

The peak amplitude of the marker pulse $e_3$ is adjusted by the coupled amplifier consisting of transistors Q4 and Q6 which amplify the pulse $e_3$ to a suitable value to reduce the slope of the sweep ramp voltages to a point just above zero slope. This is necessary to cause the differential amplifier Q1, Q2 to fully complete its switching since otherwise it might remain at an intermediate switching level with a constant output voltage from amplifier 26' because of the constant $e_{sum}$ voltage.

The amplifier Q4, Q6 has its total gain adjusted by a dwell adjust potentiometer R11 which is coupled through a resistor R12 to the emitter of Q4. Other feedback and biasing resistors include R13 coupled to the base of Q4, R14 coupled between the base of Q4 and a −20 volt voltage source, R16 coupled to the collector of Q4, R17 coupled to the collector of Q6 the −20 voltage source, R18 coupling the collector Q6 to the emitter of Q4, and R19 coupling the emitter of Q4 to ground. The above circuit configuration provides a DC offset voltage on the output line 33 which is coupled into the sweep generator 10 as shown within the dashed block outline.

Broadly speaking, sweep generator 10 produces the ramp output which is coupled to voltage controlled oscillator 11 (FIG. 1) by use of a Miller integrator. The linear sweep voltage is initiated by a trigger input to a Schmitt trigger 51. This unblocks or opens a diode CR4 which is coupled to the gate of a field effect transistor Q7 which in turn is coupled to transistors Q8 and Q9. Q7 through Q9 form the Miller integrator amplifier.

The Miller integrator also includes associated resistors R26 through R32 and a bypass capacitor C8 which provides the proper biasing and voltage supply for the integrator.

Also coupled to the output of Schmitt trigger 51 is a clamping diode CR5 which in combination with potentiometer ґ21 determines the start level of the sweep voltage. Potentiometer R21 is in parallel with a resistor R22 which are both coupled between the emitter of Q9 and the ramp output line. The Miller integrator circuit is completed by the capacitors C1 through C4 which are ganged together at one end to the ramp output line and selectively switched through a switch S1 to the gate input of Q7 depending on the slope of the sweep ramp desired.

Switch S1 is ganged to a switch S2 which couples corresponding capacitors C11 through C14 to holdoff transistor Q11. Q11 controls the holdoff time of the sweep voltage. Switches S1 and S2 selectively produce sweep ramps of varying slopes and corresponding holdoff times.

A sweep vernier potentiometer R23 is coupled to the rate controlling voltage line 33 and to switch S1 through a resistor R24. A capacitor C16 is in parallel with R24. A marker pulse on line 33 reduces the sweep charging current coupled back into the input of the Miller integrator causing the sweep voltage to have its slope almost reduced to zero assuming a maximum amplitude of the marker.

Holdoff transistor Q11 has its base input coupled to a potentiometer R32 which is parallel coupled to resistor R33. R32 and R33 are coupled to the sweep ramp output line through a resistor R34. The other side of the parallel combination is coupled to a −20 volt source through series coupled resistor R36. The setting of R32 determines the top of the sweep ramp.

More specifically, the emitter of Q11 is coupled back to the input of Schmitt trigger 51. When the emitter of Q11 reaches a predetermined upper hysteresis level the Schmitt trigger switches to block further charging of the Miller integrator. At this point Q11 now determines the holdoff time of the ramp output voltage through potentiometer R37 which is coupled between a −20 volt source and to ground through a resistor R38. The moving contact arm of the potentiometer is coupled to the emitter of Q11 through a resistor R39.

In summarizing the operation of the sweep oscillator of the present invention and referring to both FIGS. 1 and 2 the comparator 26 with the adjustment of potentiometer 29 provides for an intensity marker at a predetermined frequency. Specifically, a marker pulse $e_3$ is generated which has a base width $t_1$ determined by the sweep rate. This provides a constant ratio of the total sweep time to the intensity marker time. Amplifier Q4, Q6 amplifies the marker pulse $e_3$ to an amplitude just below that which will produce a zero sweep ramp slope. This voltage on line 33 reduces the sweep ramp by preventing further charging of the Miller integrator capacitors, C1 through C4. This causes a modification of the sweep voltage as shown by the waveform 34 to produce a substantially horizontal portion 36 which thus produces the intensified marker spot 36'.

Thus, the present invention has provided an improved sweep oscillator with an intensity marker spot which provides a clear indication of the frequency of a point of the frequency response of a network under test. Moreover, since the intensification marker can be adjusted to any position on the output trace on the oscilloscope, pin-type markers as well as birdie markers can be intensified. As shown in the alternative embodiment of FIG. 1A, the rapidly changing portions on the output characteristics of a network under test can be slowed for better visual presentation. Finally, in, for example, the case of Smith-type plots where no direct sweep voltage is coupled to the display oscilloscope, the present invention still provides adequate marking.

I claim:

1. A sweep oscillator having a predetermined signal frequency range comprising: voltage controlled oscillator means; means for sweeping said oscillator means through said predetermined frequency range, said sweeping means producing a substantially linear sweep voltage; means coupled to said sweep means for slowing said sweep of said oscillator means including comparator means responsive to a reference voltage of predetermined magnitude and said linear sweep voltage equaling said reference voltage magnitude for slowing said sweep for a portion of said range.

2. A sweep oscillator as in claim 1 in which said sweep slowing means is responsive to the rate of said sweep voltage for maintaining a constant ratio between the time duration of said portion and the total sweep time.

3. A sweep oscillator as in claim 2 in which said ratio is one to 20,

4. A sweep oscillator having a predetermined signal frequency range comprising: voltage controlled oscillator means; means for sweeping said oscillator means through said predetermined frequency range; means coupled to said sweeping means for slowing said sweep of said oscillator means including mixer means responsive to a reference signal source of predetermined frequency and the output signal of said voltage controlled oscillator means for slowing said sweep of a portion of said range when said frequency of said output signal equals said predetermined frequency.